Nov. 8, 1927.                                           1,648,749
                    S. UDSTAD ET AL
              BROOM CORN HARVESTING MACHINE
                 Filed Sept. 26, 1925        10 Sheets-Sheet 1
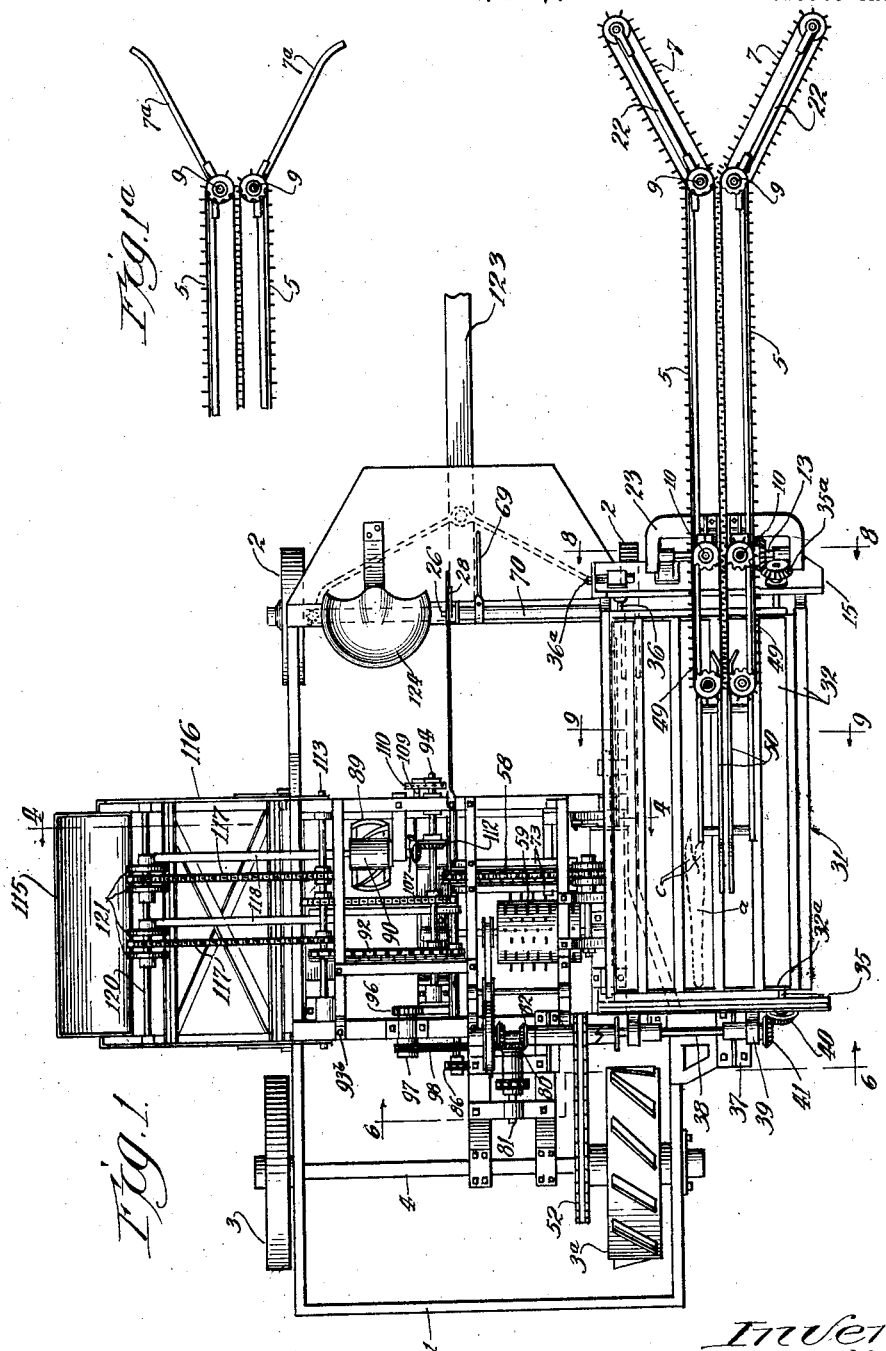

Nov. 8, 1927. 1,648,749
S. UDSTAD ET AL
BROOM CORN HARVESTING MACHINE
Filed Sept. 26, 1925  10 Sheets-Sheet 2
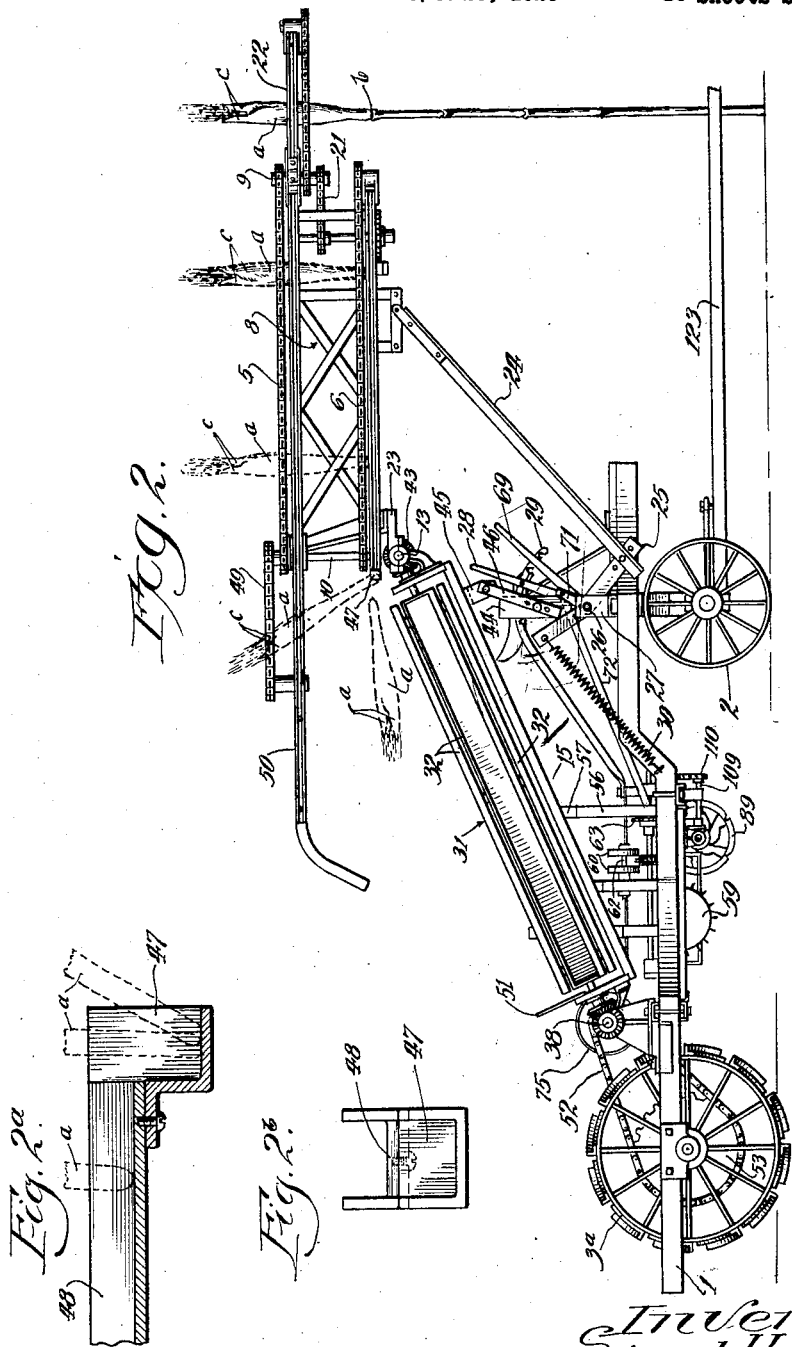
Inventors.
Sivert Udstad
William T. Owens.

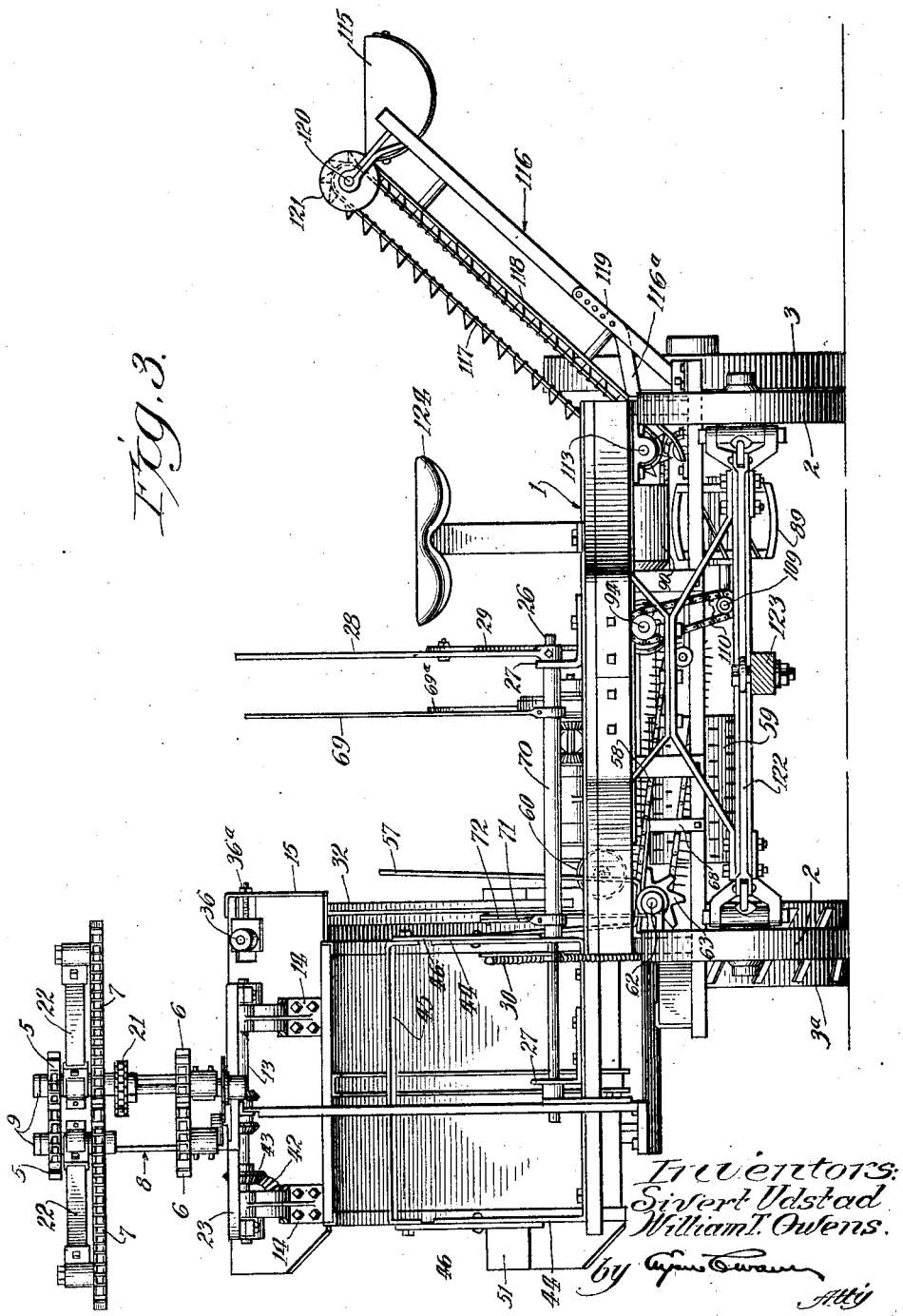

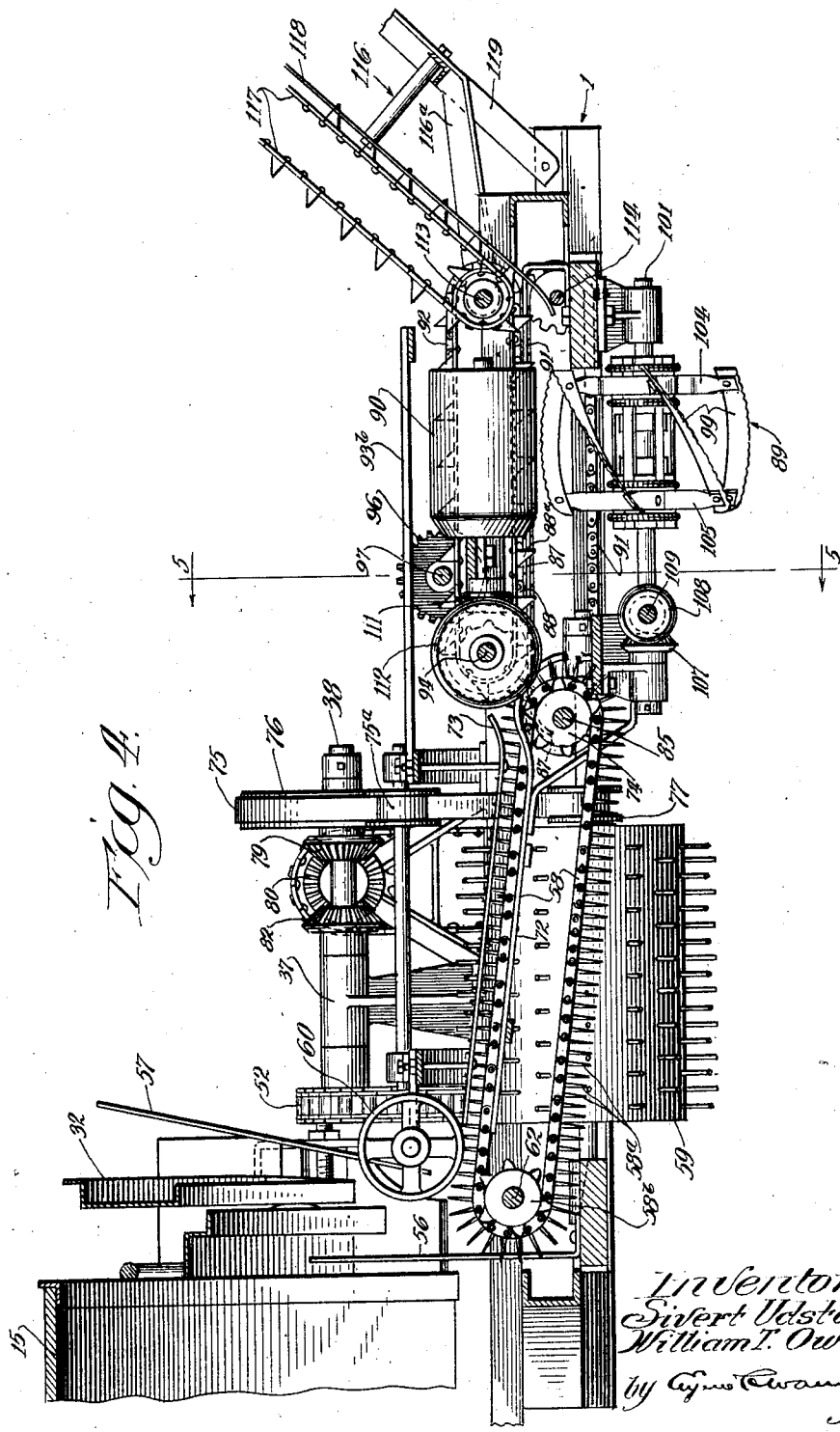

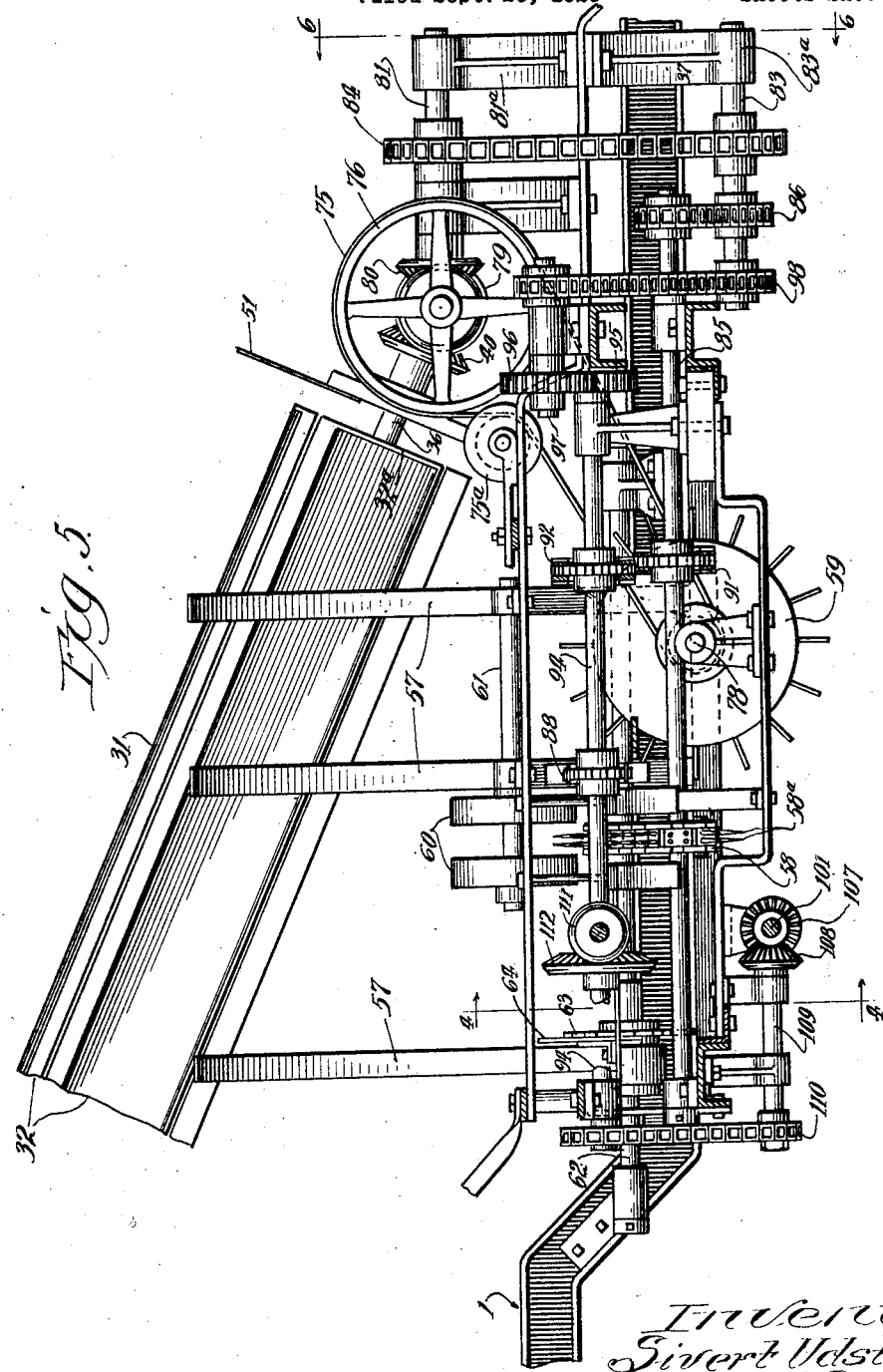

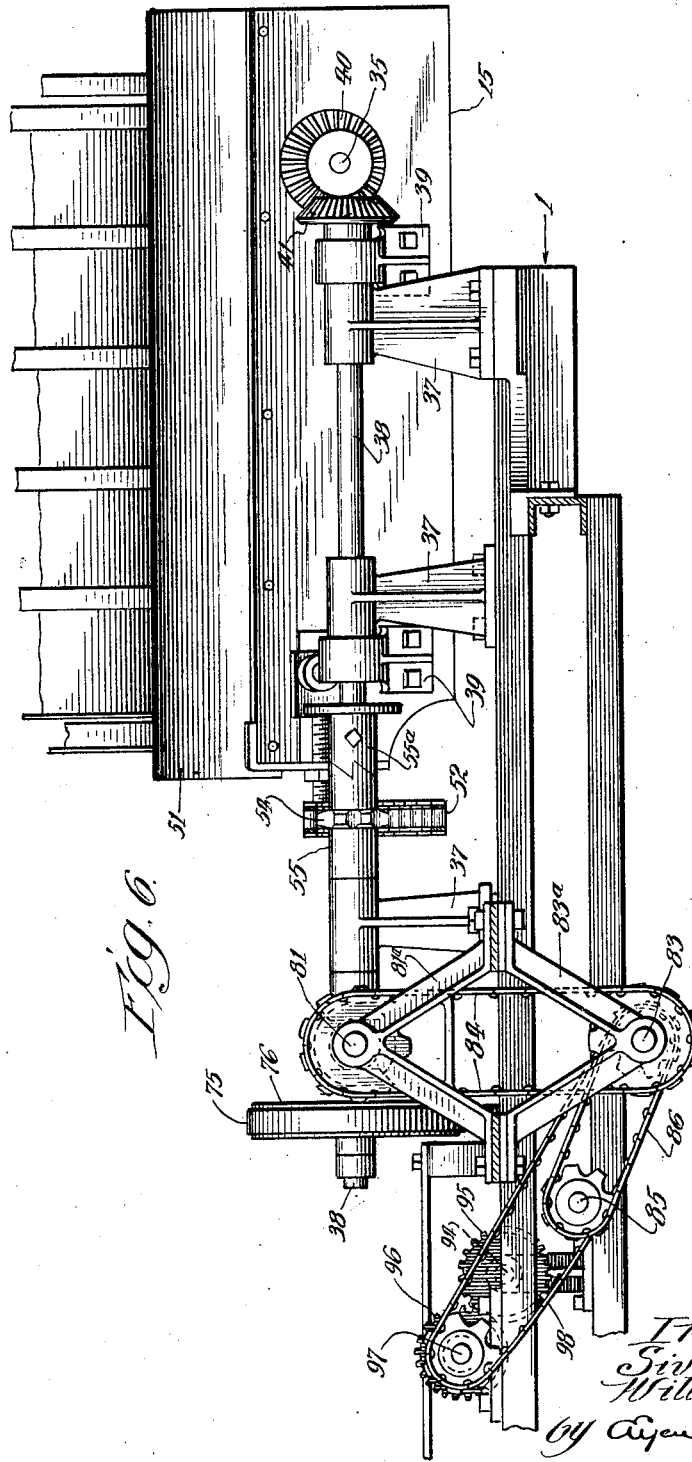

Nov. 8, 1927.
S. UDSTAD ET AL
1,648,749
BROOM CORN HARVESTING MACHINE
Filed Sept. 26, 1925
10 Sheets-Sheet 7
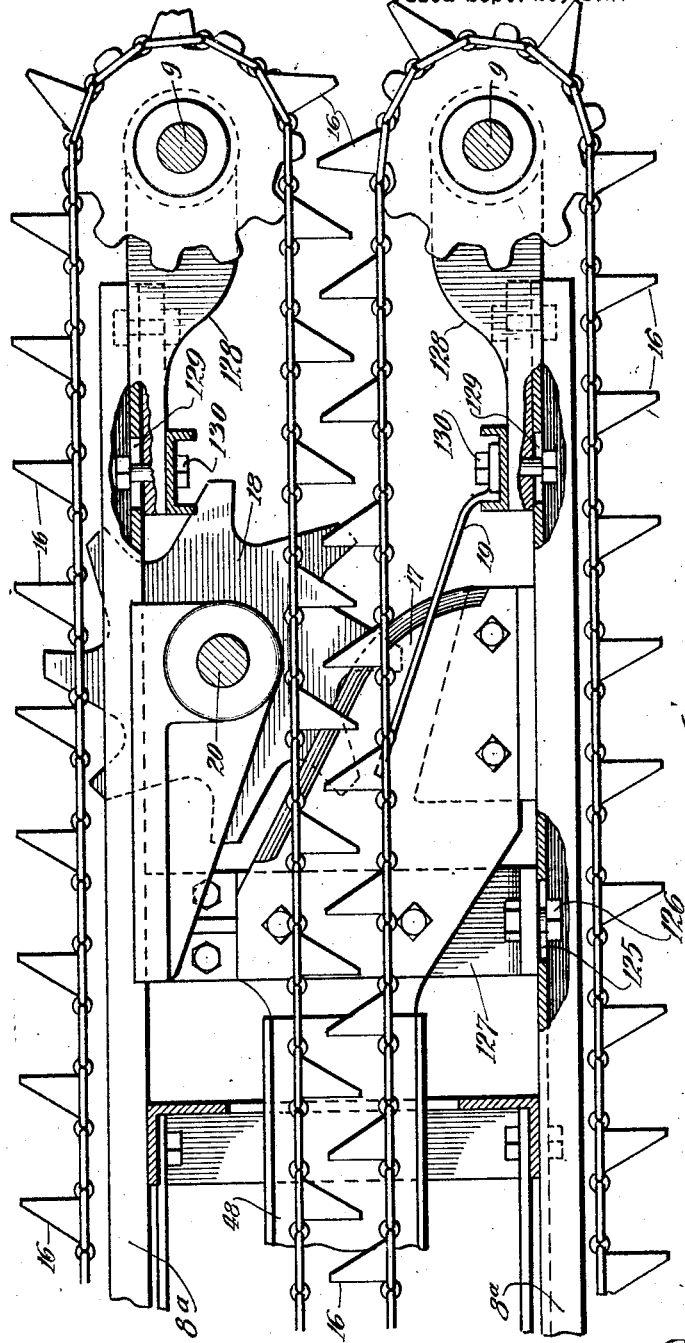
Inventors:
Sivert Udstad
William T. Owens.

Nov. 8, 1927.
S. UDSTAD ET AL
1,648,749
BROOM CORN HARVESTING MACHINE
Filed Sept. 26, 1925   10 Sheets-Sheet 8
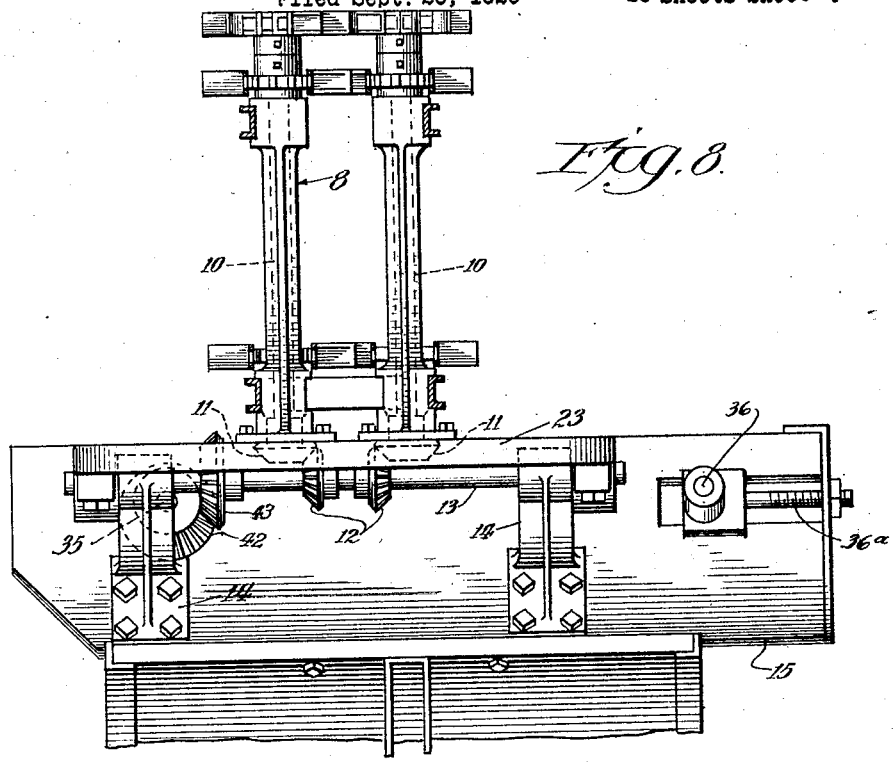
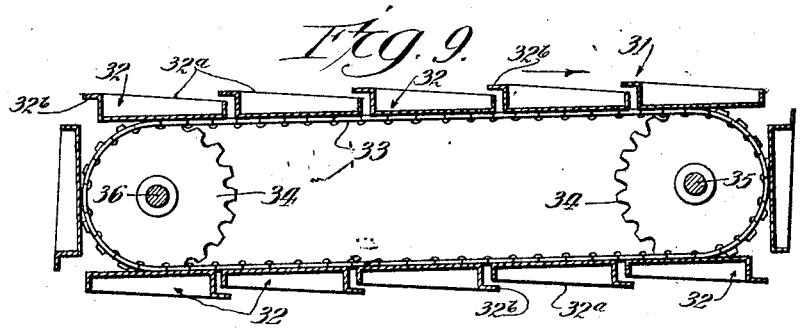
Inventors:
Sivert Udstad
William T. Owens.

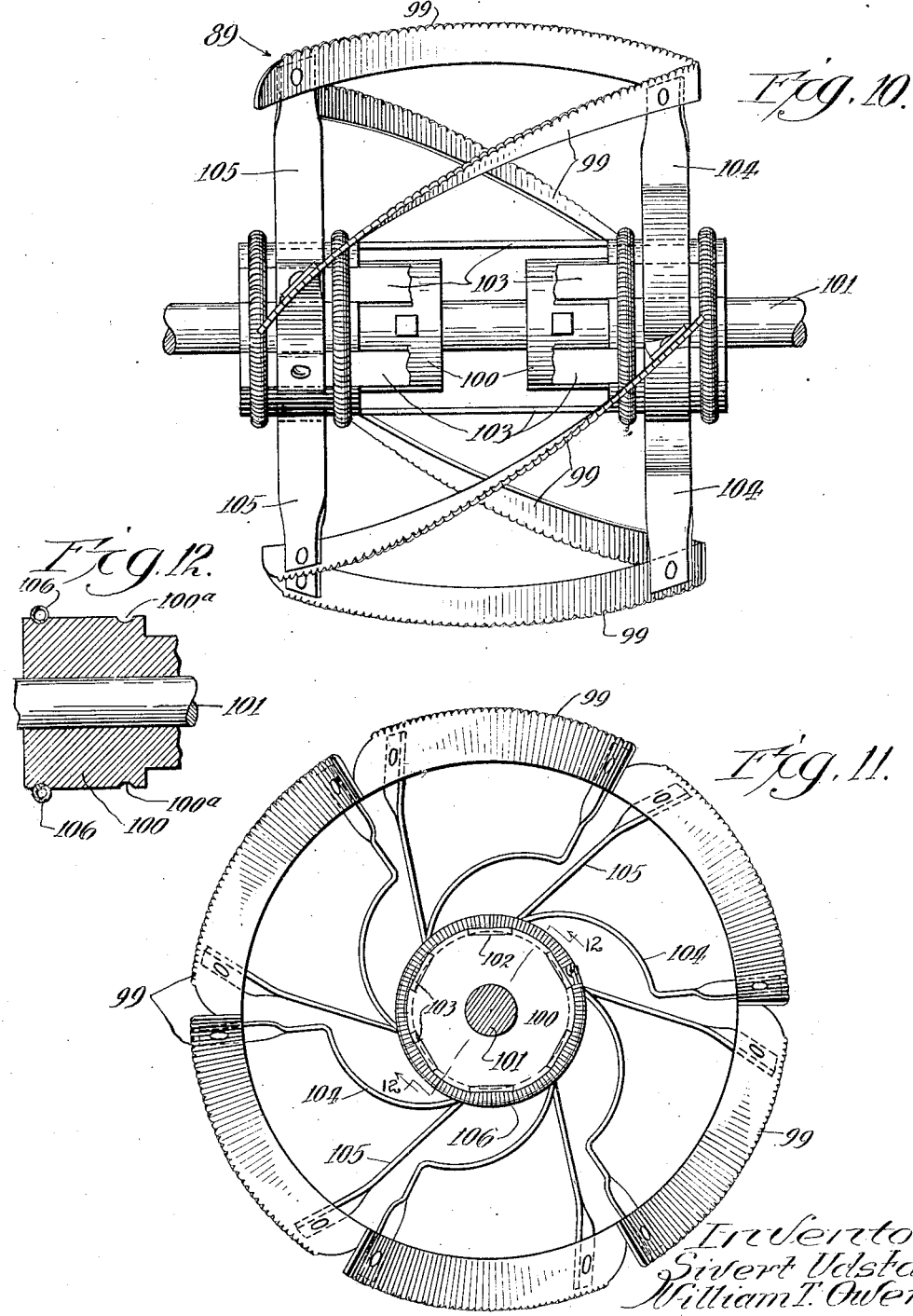

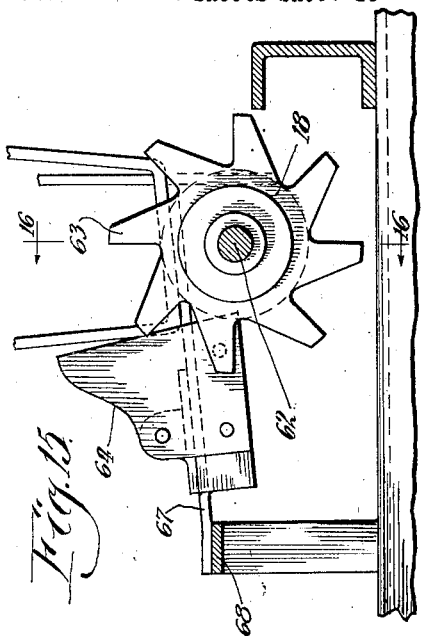
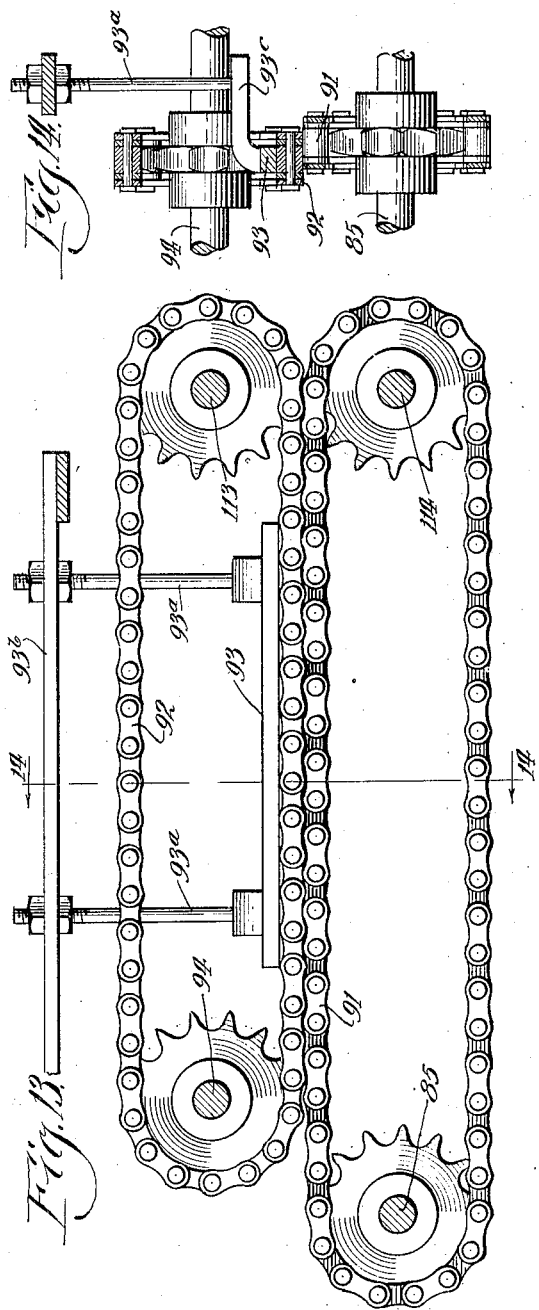
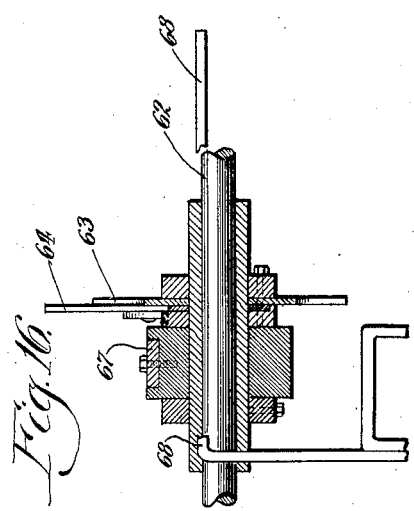

Patented Nov. 8, 1927.

1,648,749

UNITED STATES PATENT OFFICE.

SIVERT UDSTAD, OF AURORA, ILLINOIS, AND WILLIAM T. OWENS, OF LYCAN, COLORADO.

BROOMCORN-HARVESTING MACHINE.

Application filed September 26, 1925. Serial No. 58,688.

This invention relates to machines for harvesting and threshing broom-corn.

One object of our invention is to provide a machine, which while being moved through the field will perform all the necessary functions, to gather in and cut the tops or upper ends off the standing stalks, cut or trim the severed tops at the root or joint of the boots, seed or thresh the tops, strip the boots therefrom, and finally discharge the tops from the machine into a suitable receiving hopper or trough, all as a continuous and automatic operation.

A further object of our invention is to incorporate in the machine means for causing the severed tops to all assume the same positions and thus enable their boot and bush ends to be properly presented to the boot-cutting and seed-threshing assemblies, respectively.

A further object of our invention is to make the gatherer and boot cutter assemblies adjustable so that they may be set either for standard or for dwarf corn.

A further feature of the invention is to provide a simple and effective boot stripper assembly and embody it in the machine as a unit or part thereof so that the boot stripping operation will be performed as one of the automatic operations of the machine.

Other and further objects of our invention will appear from the following specification taken in connection with the accompanying drawings, in which—

Fig. 1 is a top plan view of our improved machine;

Fig. 1ª is a top plan view of a modified form of stalk gatherer;

Fig. 2 is a side view of the machine;

Fig. 2ª is an enlarged vertical sectional view of a pocket or stop assembly to be hereinafter described;

Fig. 2ᵇ is an end view of the same;

Fig. 3 is a front view of the machine;

Fig. 4 is an enlarged fragmentary vertical sectional view on the line 4—4 of Figs. 1 and 5;

Fig. 5 is a fragmentary vertical sectional view on line 5—5 of Fig. 4;

Fig. 6 is a vertical sectional view on line 6—6 of Figs. 1 and 5;

Fig. 7 is an enlarged fragmentary top plan view of the gatherer chain and cutter assembly;

Fig. 8 is a fragmentary vertical sectional view on line 8—8 of Fig. 1;

Fig. 9 is an enlarged vertical sectional view through the collecting conveyer on line 9—9 of Fig. 1;

Figs. 10 and 11 are side and end views, respectively, of the boot stripping wheel;

Fig. 12 is a diametrical sectional view through a hub of said wheel on line 12—12 of Fig. 11;

Fig. 13 is a side view of the grasping chains of the boot stripping assembly;

Fig. 14 is a vertical sectional view on line 14—14 of Fig. 13; and

Figs. 15 and 16 are detail views of the boot cutter assembly, Fig. 16 being a vertical section on line 16—16 of Fig. 15.

In the drawings, 1 indicates the main frame of the machine. This frame is horizontally disposed and has a pair of front wheels 2, 2 and a pair of rear wheels 3, 3ª, the latter being a cleated driving wheel, as shown in Figs. 1, 2, and 3. The rear wheels 3, 3ª are mounted on an axle 4 connected to the frame, the cleated wheel 3ª furnishing the power for the machine in the movement of the same through the field.

Supported above the frame 1, in a manner to be hereinafter described, is the stalk gathering and cutting assembly. This mechanism is preferably located to one side of the frame 1 and projects forward of the same, as shown in Fig. 1. Said mechanism includes horizontally disposed upper and lower pairs of conveyer chains 5, 5 and 6, 6, respectively. Arranged in front of these chains and cooperating therewith are outspread or divergent elements either in the form of conveyer chains 7, 7, as shown in Fig. 1, or guide bars 7ª, 7ª, as shown in Fig. 1ª. These elements are between the upper and lower chains 5, 6 and gather in the standing stalks and guide them into the spaces between the opposed inner leads of chains 5, 6 in the movement of the machine through the field.

Chains 5, 6 are carried by a frame 8, in which are journaled two pairs of vertical shafts 9, 10, there being a pair of these shafts at the opposite ends of the chains for driving them, as shown in Figs. 1 and 2. The rear shafts 10 extend below the frame 8 and have fixed thereto bevel gears 11, 11 (Fig. 8) in mesh with similar gears 12, 12 fixed to a horizontal shaft 13. This shaft is journaled in brackets 14, 14 at the upper end of an upwardly inclined auxiliary frame 15 of a collector, to be hereinafter described.

Chains 5, 6 are provided about their outer peripheries with lugs or teeth 16, 16, as best shown in Fig. 7. Said lugs alternate on passing between the inner leads of the chains 5, 6 to engage the upper ends or tops $a$ of the stalks and guide them to and past the cutter assembly to be presently described. The two pairs of chains 5, 6 are vertically spaced apart to engage the upper ends or tops $a$ of the stalks at separated points to hold them upright while passing between the chains, as shown in Fig. 2.

The cutter assembly includes a blade 17 fixed to the frame 8 below the lower set of chains 6, 6 and adjacent the front end thereof, as shown in Figs. 2 and 7. A toothed wheel 18 in its rotation presses the stalks against the cutting edge of the blade 17 to cut off the tops $a$ from the stalks. An inclined rod or bar 19 attached to the frame 8 extends rearward over the blade and guides the stalks between the blade and the wheel.

Said wheel 18 is fixed to a vertical shaft 20 journaled in the frame 8 and driven from one of the front shafts 9 by a sprocket chain 21, as shown in Fig. 2. The divergent chains 7, 7, when used, are driven from the front shafts 9, 9 and are supported in front of the machine from bars 22, 22 pivotally carried on the shafts 9, 9 so that the spread of the chains may be varied.

A bracket 23 pivotally supports the rear end of the frame 8 on the horizontal shaft 13 and enables the front end of said frame to be moved up or down to adjust the frame 8 for stalks of different heights, thereby adapting the machine for standard as well as dwarf corn.

The forward end of the frame 8 is adjusted through a link 24 extending between the frames 1 and 8 and having pivotal connection with both. The lower end of this link 24 is pivotally connected with the frame 1 through an arm 25 fixed to a horizontal shaft 26 journaled in upright standards 27 on said frame, as shown in Figs. 2 and 3. Shaft 26 is turned by a hand lever 28 for adjusting the front end of the frame 8. Said lever 28 co-operates with a notched segment 29 for holding the forward end of the frame 8 in its adjusted positions. As shown in Fig. 2, the link 24 has an adjustable connection with the arm 25 by a bolt and a plurality of holes in the respective parts. A coiled spring 30 is connected with the frame 1 and the upper end of the arm 25 to assist in adjusting the frame.

To the rear of the frame 8 is a downwardly inclined collector 31 in the form of an endless conveyer comprising a plurality of laterally narrow shallow pans or trays 32, 32, as shown in Figs. 1 to 5 and 9. These pans 32 are carried by a pair of conveyer chains 33 running over sprocket wheels 34, 34 on parallel shafts 35, 36, as shown in Fig. 9. The shafts 35, 36 extend lengthwise of the frame 15, as shown in Figs. 1 and 2, and are journaled at the ends thereof.

Upright standards 37, 37 on the frame 1 at the rear end of the inclined frame 15 support a horizontal shaft 38 from which the rear end of said frame 15 is supported by brackets 39, 39 on said frame, as shown in Figs. 1, 2, and 6. The shaft 35 of the collector is driven by the shaft 38 by meshing bevel gears 40, 41 (Figs. 1 and 6) on said shafts; while the shaft 36 drives the horizontal shaft 13 by meshing bevel gears 42, 43 on said shafts, as shown in Figs. 2 and 3. Shaft 36 is adjustable in frame 15 by screws 36$^a$ to adjust the tension on chains 33.

The frame 1 is provided with a pair of upright standards 44, 44 (Figs. 2 and 3) beneath the upper or forward end of the inclined frame 15. An inverted yoke 45 is fixed to the under side of the frame 15 and has its depending ends pivotally connected with the standards 44 by links 46, 46. By providing a series of holes in the links, the upper end of the frame 15 and consequently the rear end of the frame 8 may be adjusted up or down to level the gatherer to accord with the vertical adjustment of its front end.

At the delivery or rear ends of the chains 5, 6, we provide means for causing the tops or severed upper ends $a$ of the stalks to tip over backwards and drop into the pans 32 with their bush ends extending downwards, as shown in Fig. 2. To accomplish this we provide a stop 47, preferably in the form of an upwardly opening pocket (Figs. 2 and 2$^a$), at the rear end of a channel bar 48 (Fig. 7) horizontally disposed beneath the lower chains 6, 6 and in line with the space between their inner leads. The bottom of this stop or pocket 47 is below the bottom wall of the channel bar 48, and the severed tops $a$ drop down into the pocket on sliding off the rear end of said bar. The upper ends of the tops are carried rearward while their lower ends are in the pocket 47 by a pair of chains 49, 49 which continue rearward from the upper chains 5, 5, as shown in Figs. 1 and 2. The chains 49, 49 are driven by the rear shafts 10, 10 of the chains 5, 6.

With the lower ends of the tops $a$ resting in the pocket 47 and their upper ends being moved rearward by the chains 49, the tops are tipped over backward and on being released from the chains 49 drop into the pans 32 with their bush ends downward, as shown in Fig. 2. Closely spaced guide bars 50, 50 continue rearward beyond the chains 49 to prevent the tops from falling crosswise in or over the pans 32. The rear ends of these bars 50 are curved downward so as to direct the upper ends of the tops into the pans.

When the tops fall into the pans 32, they slide down the same until their bush ends come to rest against the upstanding rear end walls 32$^a$ thereof. This lines up the bush ends of the tops and presents their severed or boot ends in position for the subsequent seed threshing and boot stripping operations of the machine.

An upstanding stop board or plate 51 (Fig. 2) is fixed to the frame 15 at the rear or lower ends of the pans 32 to prevent the tops sliding out of the pans. The latter, as shown in Fig. 9 are shallower along one side than the other and have laterally extending side flanges 32$^b$ to project over the shallower sides of the adjacent pans to prevent the tops falling into the spaces between the pans and hindering the operation of the machine.

The shaft 38 is driven from the cleated wheel 3$^a$ by a chain 52 trained over sprocket wheels 53, 54 (Figs. 2 and 6), the former being on the hub of the wheel 3$^a$ and the other on a clutch sleeve 55 loose on the shaft 38. A clutch collar 55$^a$ is fixed to the shaft 38 at the sleeve 55 and cooperates therewith to connect the shaft to the wheel.

As the loaded pans 32 turn over the inner side of the collector 31, the severed tops $a$ in the pans are discharged between pairs of upstanding bars 56, 57 (Fig. 4), which catch the tops and guide them to a conveyer chain 58 vertically arranged and running in front of a threshing cylinder 59. Said chain 58 carries a plurality of relatively long prongs 58$^a$ on its outer periphery for engaging the boot ends of the tops and carrying them past the spiked cylinder 59.

The prongs 58$^a$ are arranged in pairs and relatively close together, so that they enter the tops above the joint of the boot to firmly hold the tops while being trimmed at their boot ends and threshed at their bush ends. Wheels 60, 60 are on opposite sides of the upper lead of the chain 58 at its receiving end and have the prongs 58$^a$ pass between them. These wheels serve to force the tops down between and on the prongs so that the tops will be held by the prongs against the pull of the threshing cylinder 59. The shaft 61 (Fig. 5) of the wheels 60 is supported above the frame 1 in any suitable manner.

The receiving end of the chain 58 runs over a sprocket wheel 58$^b$ (Fig. 4) on a shaft 62 journaled on the main frame 1. A toothed wheel 63 (Figs. 2 and 3) is splined on this shaft in front of the chain 58 and co-operates with a cutting blade 64 for trimming off the severed or butt ends of the tops just above the joint of the boot $c$, so that the latter may be readily stripped or pulled from the tops in the subsequent operations of the machine.

The wheel 63 and blade 64 are adjustable along the shaft 62 by means of the following construction. As shown in Figs. 15 and 16, the wheel 63 rotates with a sleeve 65 splined on the shaft. Loose on this sleeve at one side of the wheel is a collar 66. This collar is held from rotation by an arm 67 having its outer end resting on a horizontal bar 68 fixed to the main frame 1. The cutter blade 64 is mounted on this arm and has its cutting edge alongside of the wheel 63, as shown.

The collar 66 is held between shoulders or abutments on the sleeve 65 and moves along with the sleeve in the adjustment of the assembly along the shaft 62. This is accomplished by the lever 69 (Fig. 3) connected with a tube 70 on shaft 26, as shown in Fig. 3. An arm 71 is fixed to this tube and by a link 72 (Fig. 2) is connected with the sleeve 66. A latch on this lever and a notched segment 69$^a$ on the frame 1 holds the cutter blade and its wheel in adjusted positions.

As shown in Fig. 4, the chain 58 extends at an inclination downward from its delivery end so that the bush ends of the tops will be dragged generally downward along the upper surface of the cylinder 59 to effectively remove seeds. Frequently the bush ends of the tops extend back beyond the cylinder 59 at the entrance end thereof, but as the chain 58 carries the tops along the cylinder at a relatively rapid speed, the bush ends lag back by their engagement with the spikes of the cylinder and thereby cause the threshing of seeds even from the tip ends of the tops.

A bar 72 (Fig. 4) is arranged beneath the upper lead of the chain 58 and prevents sagging of the chain as it carries the tops past the cylinder 59. A pair of bars 73, 73 are arranged above the chain 58 on opposite sides of the prongs 58$^a$ and keep the ends of the tops at the chain from raising off the prongs while passing the cylinder 59. The ends of these guards 72, 73 at the delivery end of the chain 58 are curved upward to strip the tops from the prongs as the latter turn over the sprocket wheel 74 at such end of the chain (Fig. 4). The lower bar 72 continues about the wheel and extends to the outer ends of the prongs so as to free all tops engaged therewith as the tops are passed to the boot stripping assembly, to be presently described. The guides 72, 73 are supported from the frame 1 by suitable brackets, as shown in Fig. 4.

The cylinder 59 is driven at a relatively high speed by a belt 75 (Fig. 4) trained at one end over a large pulley 76 on the shaft 38 and at the other end over a smaller pulley 77 on the cylinder shaft 78, as clearly shown in Fig. 5. An adjustable belt tightening pulley 75$^a$ engages the belt 75 between the pulleys 76, 77, as shown in said Fig. 5. The large pulley 76 carries a bevel gear 79 which meshes with a like gear 80 on a shaft 81 (Figs. 1 and 5). This latter gear meshes with a like gear 82 on shaft 38. By this arrangement the threshing cylinder 59 is rotated in the proper direction.

As shown in Fig. 6, shaft 81 is journaled above the frame 1 in upright standards 81$^a$ and a shaft 83 is journaled below the frame 1 in hangers 83$^a$, the upper shaft driving the lower one by a sprocket chain 84. Shaft 83 drives shaft 85 at the delivery end of chain 58 by a sprocket chain 86.

As explained, the chain 58 grasps the boot ends of the tops $a$ so that their bush ends can be presented to the threshing cylinder 59. As the tops leave the chain 58, they are grasped by their bush ends so that their boots $c$ may be presented to the boot stripping means.

Chain 58 delivers the tops onto a horizontal guide bar 87 (Fig. 4), which extends on across the frame 1 and beneath the conveyer chain 88 vertically disposed and having peripheral lugs 88$^a$, as shown in Figs. 1 and 4. This chain 88 and guide 87 are offset slightly rearward of the chain 58 so that the boot ends of the tops project forward beyond the guide 87 and chain 88 to pass between the boot stripping wheel 89 and its co-operating roll 90, as shown in Figs. 1 and 4.

The bush ends of the tops are delivered onto the upper lead of a conveyer chain 91 (Fig. 13) and are tightly gripped between said lead and the opposed lower lead of a co-operating upper chain 92 to hold the tops while the boots $c$ are stripped or pulled therefrom by the wheel 89 and to resist the pull thereof. A bar 93 is arranged along the upper side of the lower lead of the upper chain 92 for preventing said lead releasing its grip on the bush ends of the tops as they are carried along by the chains. Threaded rods 93$^a$ extending downward from an upper support 93$^b$ hold the bar 93 against its chain. These rods are offset to one side of the chains 91, 92 and engage laterally projecting lugs 93$^c$ on the bar, as shown in Fig. 14.

Chain 91 is driven by shaft 85 at its receiving end, while chain 92 is driven from the like end by a shaft 94 arranged above and offset to one side of shaft 85, as shown in Figs. 4 and 13. As shown in Fig. 6, shaft 94 carries a spur gear 95, which meshes with a like gear 96 on a short shaft 97, the latter being driven from shaft 83 by a sprocket chain 98.

As shown in Figs. 2, 3, 4 and more particularly in Figs. 10 and 11, the boot stripping wheel 89 has a plurality of blades 99, 99 arranged to extend lengthwise of the wheel. The wheel has a pair of hubs 100, 100 secured to a shaft 101. These hubs have aligned longitudinal grooves 102 to receive flat bars 103. Radially projecting arms 104, 105 are secured to these bars adjacent their outer ends, and the blades 99 are secured to the outer ends of these arms.

Blades 99 have serrated outer edges to facilitate gripping the boots $c$ for pulling or stripping them from the bush ends of the tops. As illustrated in Figs. 3 and 4, the receiving end of the roll or cylinder 90 is beveled or tapered and the blades are outwardly curved to permit the boot ends of the tops to readily enter between the stripping wheel 89 and its roll 90. The arm 104 is bent to have its outer ends offset circumferentially from the outer ends of its adjacent arms 105, so that the blades 99 connecting them will extend spirally across the wheel, as shown clearly in Fig. 10. This causes the blades to exert an outward pull on the boots when engaging the same and also equalize the circumferential pull of the wheel.

The outer ends of the bars 103 extend beyond the arms 104, 105 and are yieldably held on the hubs 100 by resilient bands 106, 106. These allow the blades to give or yield backward, should the boot ends of the tops become bunched between the stripper wheel 89 and the roll 90 or be abnormally large, thereby relieving the pressure on the wheel without hindering its stripping action.

As shown in Fig. 4, the shaft 101 of the stripping wheel carries a bevel gear 107 in mesh with a like gear 108 on a cross shaft 109 connected with shaft 94 on the chain 92 by a sprocket chain 110. The shaft of roll 90 has a bevel gear 111 in mesh with a like gear 112 on shaft 94 for rotating said cylinder.

After stripping the boots from the tops they are ready for delivery from the machine. As shown in Figs. 1 and 3, the delivery ends of the conveyer chains 87 and 92 run over sprockets on a shaft 113 horizontally disposed at the side of the machine opposite the collector 31. The delivery end of the lower chain 91 runs over a sprocket on a shaft 114 below and substantially parallel with the shaft 113, as shown in Figs. 4 and 13.

Means are provided for raising the finished tops to an elevated hopper 115 supported by a frame 116 at the delivery side of the machine, as shown in Fig. 3. The elevating means comprises a pair of upwardly inclined conveyer chains 117, 117 running from the shaft 113 to the hopper 115. These chains have lugs for engaging the finished tops and carrying them up guide bars 118 beneath the lower leads of these chains, as shown in Fig. 3. The lower ends of these bars 118 are adjacent the delivery ends of the horizontal chains 87, 91 and 92 for catching the finished tops as they are delivered from said chains.

The lower end of the frame 116 is mounted on the shaft 113 by arms 116ª (Fig. 4). This frame 116 is held in its inclined position by braces 119, which have their lower ends connected with frame 1 and the upper ends connected with a shaft 120 at the upper end of the frame 116 and over which the chains 117 run on suitable sprockets, as shown.

Two pairs of discs 121, 121 are fixed to the shaft 120, there being a pair of discs for each chain 117 and on opposite sides thereof, as shown in Fig. 1. These discs strip the finished tops from between the lugs of the chains as they turn upward about the shaft 120 and cause the tops to drop into the hopper 115.

Briefly the machine shown and described operates as follows.

The parts being set as shown in the drawings, the machine is drawn forward through a field of standing broom-corn. The stalks are gathered in by the divergent chains 7, 7 or bars 7ª, 7ª, whichever are employed, and guided into the spaces between the upper and lower chains 5, 6. The tops are cut off of the standing stalks by the cutter blade 17 and the severed tops are carried upright back toward the collector 31 by the chains 5, 6. These chains deliver the tops to the collector 31, the tops being tipped over rearwardly to slide down the pans 32 with their bush ends lowermost and their severed or butt ends uppermost.

The collector 31 delivers the tops to the chain 58 and at this point their butt ends are cut off or trimmed just along or near the joint of the boots or husks, by the blade 64. The chain 58 carries the bush ends of the tops past the cylinder 59, by means of which the seeds are threshed out. After this operation, chain 58 delivers the threshed tops to conveyer chains 87 and 91 and 92, by which the bush ends of the tops are held and carried while the boots or husks are stripped off and discharged from the machine by the stripper wheel 89 and its roll or cylinder 90, the tops are then delivered to the elevator chains 117 and are discharged into the hopper or trough 115 for taking from the machine. When this point is reached the finished tops are ready for shipment and use in the make-up of brooms.

As shown in Fig. 3, the front wheels 2, 2 have a knuckle connection with the fixed front axle 122 like that used in the automobile and truck design. A draft bar or tongue 123 is connected with this axle so that the machine may be pulled through a field.

A spring seat 124 is mounted on the main frame 1 adjacent the front end thereof and adjacent the hand levers 28 and 69 so as to be within convenient reach of the driver or operator for manipulation.

As illustrated in Fig. 7, the cutter blade 17 and its co-operating wheel 18 are adjustably connected with the side member 8ª of the frame 8 by means of elongated slots 125 and bolts 126. The blade 17 is secured to a cross-bar 127, and the latter has a rearward portion extending into the channel of bar 48 for guiding the butt ends of the tops onto the latter.

The front shafts 9, 9 of the chains 5, 6 are journaled in brackets 128, 128 having adjustable connection with the side bars 8ª, 8ᵇ of the frame 8 so that the tension on the chains may be controlled and slack taken up. This adjustment is made through elongated slots 129 and bolts 130 in the respective parts, as shown. As shown in Fig. 12, the resilient bands 106 seat in grooves 100ª extending around the hubs 100. There are a pair of these bands on each hub, being arranged to engage the bars 103 on opposite sides of the arms 104, 105.

If desired, the operative parts of the machine could be driven independently of the cleated wheel 3ª by mounting a motor on the frame 1 and connecting it with the shaft 38 or taking power from a tractor used for pulling the machine. In such a case the clutch collar 55ª would be disconnected from the sleeve 55. As shown in Fig. 2ª, the pocket 47 is laterally narrow to hold the tops from slipping sideways as their upper ends are carried rearward by the chains 49. As shown in Fig. 15, the guide bars 56, 57 at the cutter means are connected together at their lower ends and are there secured to the arm 67 so as to be carried with the cutter in its adjustment on the shaft 62.

The details of structure shown and described and the exact arrangement of parts may be variously changed and modified without departing from the spirit and scope of our invention.

We claim as our invention:

1. In combination in a machine for harvesting and threshing broom-corn, means for gathering and cutting the tops from the standing stalks, means for severing the boots from the tops at the joints therewith, means for threshing seeds from the bush ends of the tops, and means for stripping the boots from the tops after the threshing of the same, all as consecutive and continuous operations in the movement of the machine.

2. In combination in a machine for harvesting and threshing broom-corn, means for gathering and cutting the tops from the standing stalks, means for severing the boots from the tops at their joints therewith, means for threshing seeds from the bush ends of the tops, means between the gathering and threshing means for positioning the tops for the latter, and means for stripping the boots from the tops after the threshing of the same, all as consecutive and continuous operations in the movement of the machine.

3. In combination in a machine for harvesting and threshing broom-corn, means for gathering and cutting the tops from the standing stalks, means for severing the boots from the tops at their joints therewith, means for threshing seeds from the bush ends of the tops, means for stripping the boots from the tops after the threshing of the same, all as consecutive and continuous operations in the movement of the machine, and means for adjusting the gathering and boot severing means for setting the machine for either standard or dwarf corn.

4. In combination in a machine for harvesting and threshing broom-corn, means for gathering and cutting the tops from the standing stalks, means for severing the boots from the tops at their joints therewith, means for threshing seeds from the bush ends of the tops and afterward stripping the boots therefrom, and means for delivering the finished tops from the machine, all as consecutive and continuous operations in the movement of the machine through a field.

5. In combination in a machine for harvesting and threshing broom-corn, means at one side of the machine for gathering and cutting the tops from the standing stalks, means at the opposite side of the machine for discharging the finished tops therefrom, and means between said gathering and delivering means and co-operating therewith for carrying the tops across the machine and for threshing the seeds therefrom and afterwards stripping the boots from the threshed tops before delivery to said discharging means, all as continuous and consecutive operations in the forward movement of the machine.

6. In combination in a machine for harvesting and threshing broom-corn, means for gathering and cutting the tops from the standing stalks, means for threshing seeds from the bush ends of the tops and for stripping the boots therefrom, and a collector between the thresher and gatherer for receiving the tops from the latter, said collector being inclined downward for causing the tops to slide down the same to present their bush and boot ends, respectively, in the same relative positions to the thresher and stripper.

7. In combination in a machine for harvesting and threshing broom-corn, means for gathering and cutting the tops from the standing stalks, means for threshing seeds from the bush ends of the tops and for stripping the boots therefrom, and a collector in the form of a conveyer between the gatherer and thresher, said collector embracing a plurality of relatively shallow pans to receive the tops from the gatherer and deliver them to the thresher, said pans being inclined downward from the gatherer to the thresher for causing the tops to slide down the pans and present their bush and boot ends, respectively, in the same relative positions to the thresher and stripper.

8. In combination in a broom-corn harvesting and threshing machine, means for gathering and cutting the tops from the standing stalks, means for threshing the seeds from the bush ends of the tops and for stripping the boots therefrom, and a collector between the gatherer and thresher, said collector being in the form of a conveyer and embracing a plurality of shallow pans for receiving the tops from the gatherer and for delivering the same to the thresher and stripper, said pans being inclined downward from the gatherer so that the stalks slide down the same, and a stop plate at the lower ends of the pans to prevent the tops from sliding out of the pans.

9. In combination in a machine for harvesting and threshing broom-corn, means for gathering and cutting the tops from the standing stalks, means for threshing the seeds from the bush ends of the tops and for stripping the boots therefrom, and a collector between the gatherer and thresher for receiving the tops from the former and delivering them to the latter, said collector being in the form of a conveyer and embracing a plurality of shallow pans arranged at an inclination downward from the gatherer, said pans being shallower along one side than the other and having laterally projecting flanges extending over the shallower portions of adjacent pans to prevent the tops falling into the spaces between the pans.

10. In combination in a machine for harvesting and threshing broom-corn, stalk gathering means and co-operating cutting means for severing the tops from the standing stalks as the machine is advanced, and means for threshing the bush ends of the tops and immediately thereafter stripping the boots therefrom, said gatherer embracing two pairs of conveyer chains arranged one above the other for carrying the tops in an upright position after leaving the cutting means, and a channel bar beneath the lower chains for supporting the severed tops.

11. In combination in a machine for harvesting and threshing broom-corn, means for gathering and cutting the tops from the standing stalks, means for threshing the bush ends of the tops and immediately thereafter stripping the boots therefrom, a collector between the gatherer and thresher, a stop at the delivery end of the gatherer to arrest the lower ends of the tops as they leave the gatherer, and means arranged above the stop to carry the upper ends of the tops rearward of the gatherer and to cause the tops to tip over backwards and fall into the collector.

12. In combination in a machine for harvesting and threshing broom-corn, means for gathering and cutting the tops from the standing stalks, means for seeding the bush ends of the tops and immediately thereafter stripping the boots therefrom, a collector at the delivery end of the gatherer, said gatherer embracing conveyer chains for holding the tops upright as they move toward the collector, a stop at the delivery end of said chains to arrest the lower ends of the tops as they leave the chains, and auxiliary conveyer chains to carry the upper ends of the tops rearward beyond the gatherer to cause the tops to tip over backwards and drop into said collector.

13. In combination a broom-corn harvesting machine, stalk gathering means embracing two pairs of conveyer chains one above the other for engaging the standing stalks, cutting means associated with the lower chains for cutting the tops from the stalks, a channel bar beneath the lower chains extending rearward from the cutter for supporting the severed tops while carried along by the chains, means forming a pocket at the discharge end of said bar and extending below the same so that the tops drop into said pocket on leaving said bar, and auxiliary conveyer chains arranged above the pocket and extending rearward therefrom for carrying the upper ends of the tops rearward and causing the tops to tip over backwards on leaving said chains.

14. In combination in a broom-corn harvesting machine, means for gathering and cutting the tops from the standing stalks, seed threshing means and boot stripping means arranged one in advance of the other, and conveying means for carrying the severed tops from the gatherer past the threshing and boot stripping means, said conveying means grasping the tops at their boot ends while conveying the tops past the threshing means and grasping the tops at their bush ends while conveying the tops past the stripping means.

15. In combination in a broom-corn harvesting machine, means for gathering and cutting the tops from the standing stalks, a seed stripping cylinder, a collector at the delivery end of the gatherer for receiving the severed tops and aligning their bush and boot ends, respectively, and a conveyer for receiving the tops from the collector and engaging the tops at their boot ends for carrying their bush ends along and over the upper periphery of said cylinder, said conveyer being arranged at a downward inclination so as to increase the engagement of the bush ends with the cylinder as the tops are carried past the same.

16. In combination in a broom-corn harvesting machine, means for gathering and cutting the tops from the standing stalks, boot stripping means, a seed threshing cylinder between the boot stripper and the gatherer, a conveyer chain for carrying the tops past the threshing cylinder, said chain having sharp prongs to engage the boot ends of the tops, a guard associated with the prongs to hold the tops thereon while moving past said cylinder, and means for stripping the tops from the prongs at the delivery end of the chain.

17. In combination in a broom-corn harvesting machine, means for gathering and cutting the tops from the standing stalks, seed threshing and boot stripping means arranged one in advance of the other, means for conveying the tops from the gatherer past the threshing and stripping means, the portion of the conveying means past the stripping means embracing upper and lower chains to grip the bush ends of the tops between them while the stripper removes the boots from the tops.

18. In combination in a machine for harvesting broom-corn, means for gathering and cutting the tops from the standing stalks, seed threshing and boot stripping means arranged one in advance of the other, and conveying means for carrying the tops past the thresher and stripper, the portion of the conveying means past the stripper consisting of upper and lower endless chains with opposed leads engaged for gripping the bush ends of the tops between them, and means for holding the upper chain against the lower one so as to tightly grip the tops while being operated on by the boot stripper.

19. In combination in a broom-corn harvesting machine, means for gathering and cutting the tops from the standing stalks, seed threshing means and a bladed boot stripping means, and conveyer means for carrying the tops from the gatherer past the thresher and stripper, said stripper means embracing a stripper wheel and a co-operating roll with the blades on the wheel engaging the under side of the roll for stripping the boots from the tops.

20. In combination in a broom-corn harvesting machine, means for gathering and cutting the tops from the standing stalks, seed threshing and boot stripping means, means for conveying the tops past the threshing and stripping means, said stripping means embracing a stripper wheel and a co-operating roll above the same, said wheel having stripper blades at its periphery and arranged to extend spirally across the wheel.

21. In combination in a machine for harvesting broomcorn, means for gathering and cutting the tops from the standing stalks, seed threshing and boot stripping means, and means for conveying the tops past the threshing and boot stripping means, said stripping means consisting of a stripper wheel and a co-operating roll, said wheel having stripper blades to engage the roll and said blades being yieldably connected with said wheel.

22. A boot stripper wheel for broom-corn harvesting machines, said wheel having a hub portion, blades at the periphery of the wheel and extending spirally across said hub portion, bars on said hub portion, radial arms connecting the blades with said bars, and resilient bands about the hub portion and engaging the bars for yieldably connecting the blades with the wheel.

23. A stripper wheel for broom-corn harvesting machines, said wheel having a hub portion with longitudinal grooves therein, blades at the periphery of the wheel and extending spirally across said hub portion, bars in said grooves, radial arms connecting the bars with said blades, and resilient bands about the hub portion and engaging the bars for yieldably connecting the blades with said wheel.

24. A boot stripping wheel for broom-corn harvesting machines, said wheel having a hub portion, curved blades at the periphery of the wheel and extending spirally across the hub portion, radial arms connecting the blades with said hub portion, said blades having their outer edges notched or serrated.

25. In combination in a broom-corn harvesting machine, stalk gathering means consisting of two pairs of upper and lower conveyer chains, cutting means associated with the lower pair of chains for severing the tops from the standing stalks, a collector at the rear end of the gatherer, a pair of auxiliary chains extending rearward from the gatherer for carrying the upper ends of the tops rearward beyond the gatherer when their lower ends are released therefrom for tipping the tops backward and dropping them into the collector, guide bars extending rearward from the auxiliary chains to prevent the tops tipping sideways, and seed threshing and boot stripping means associated with said collector.

26. In combination in a broom-corn harvesting machine, a stalk gatherer consisting of two pairs of upper and lower conveyer chains, cutting means beneath the lower chains for severing the tops from the standing stalks, a channel bar beneath the lower chains for supporting the tops after leaving the cutting means, said cutting means including a blade and a rotatable toothed wheel co-operating therewith, said blade having a rear portion extending to said bar for continuing the support for the tops from the blade to the bar, and seed threshing and boot stripping means associated with the gatherer for operating on the tops after leaving the same.

27. In combination in a broom-corn harvesting machine, a stalk gatherer consisting of two pairs of upper and lower chains, cutting means for severing the tops from the standing stalks, said cutting means including a blade and a rotary toothed wheel, said blade and wheel being adjustably mounted on the frame of the gatherer, and means for threshing the bush ends of the stalks and stripping the boots therefrom after the tops leave said cutting means.

28. In combination in a broom-corn harvesting machine, a stalk gatherer consisting of upper and lower pairs of conveyer chains, cutting means associated with the lower chains for severing the tops from the standing stalks, said chains having front shafts, brackets serving as journals for said shafts, and means for adjustably connecting the brackets with the frame of the gatherer for regulating the tension of the chains.

29. In combination in a machine for harvesting and threshing broom-corn, means for gathering and cutting the tops from the standing stalks, adjustable cutting means for severing the boots from the tops at the joints therewith, a collector between the gatherer and adjustable cutter for delivering the tops thereto, guide bars carried by the adjustable cutting means for removing the tops from the collector, and means for threshing the bush ends of the tops and thereafter stripping the boots therefrom.

In testimony whereof we affix our signatures.

SIVERT UDSTAD.
WILLIAM T. OWENS.